United States Patent
Bircann

(10) Patent No.: US 6,467,959 B1
(45) Date of Patent: Oct. 22, 2002

(54) EGR VALVE WITH SELF-TEMPERATURE COMPENSATED BEARING

(75) Inventor: Raul Armando Bircann, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/836,848

(22) Filed: Apr. 17, 2001

(51) Int. Cl.[7] .............................................. F16C 17/12
(52) U.S. Cl. .............................. 384/9; 384/28; 384/278; 384/905
(58) Field of Search ................................ 384/9, 10, 14, 384/28, 29, 32, 37, 42, 278, 905

(56) References Cited

U.S. PATENT DOCUMENTS

| | | | | |
|---|---|---|---|---|
| 2,700,581 A | * | 1/1955 | Migny ........................ 384/278 |
| 2,970,019 A | * | 1/1961 | Brown et al. ................ 384/278 |
| 4,890,937 A | * | 1/1990 | Balsells ........................ 384/37 |
| 5,779,220 A | * | 7/1998 | Nehl et al. ............. 123/568.26 |
| 5,878,779 A | * | 3/1999 | Bircann et al. ........ 123/568.26 |

\* cited by examiner

Primary Examiner—Thomas R. Hannon
(74) Attorney, Agent, or Firm—Patrick M. Griffin

(57) ABSTRACT

An EGR valve having a self-compensating bearing assembly for use with a valve member having a shaft reciprocable within a valve body, includes a rigid bearing member for providing radial support and axial guidance to the valve shaft as the shaft reciprocates in the valve body; and a pliant annulus supporting the bearing member, where the pliant annulus has a density and thickness sufficient to accommodate distortion of the rigid bearing member in response to changes in temperature without interfering with shaft actuation.

8 Claims, 3 Drawing Sheets

EGR VALVE WITH SELF-TEMPERATURE COMPENSATED BEARING

TECHNICAL FIELD

This invention relates to automotive vehicle engine valves, and in particular to a bearing disposed within an exhaust gas recirculation (EGR) valve for supporting a reciprocating valve shaft.

BACKGROUND OF THE INVENTION

It is known in the art relating to automotive vehicle engines to provide selective recirculation of engine exhaust gases into the intake manifold in order to control exhaust emissions. To this end, an exhaust gas recirculation (EGR). valve may be provided which includes a valve assembly connectable with associated intake and exhaust manifolds or systems of the engine to meter the flow of exhaust gas from the intake to the exhaust.

EGR valves typically include a valve assembly operable to close or open a passage between the intake and exhaust manifolds. The valve assembly includes a valve member (or pintle) having a head connected with a shaft supported by a bearing for reciprocating motion within a valve body. An actuator assembly is operably connected with the valve assembly and includes a solenoid coil and an armature connectable with the valve member. The solenoid coil actuates the armature to open the EGR valve, which, in turn, is closed by a spring when the coil is deenergized.

To minimize leakage of exhaust gas into the valve assembly and/or the solenoid. actuator, the diametral clearance between the valve shaft and its bearing is very tight, in the range of ±0.03 mm or less.

To maximize lubricity between the reciprocating shaft and its supporting bearing, the shaft and the bearing may be composed of different materials (e.g. stainless steel and sintered brass, respectively). Typically, these materials have very different thermal properties. Because EGR valves and their components are exposed to extreme operating temperatures (−40° C. to 700° C.) and radical temperature changes, a valve shaft may ultimately seize within its bearing as a direct result of differential thermal expansion of the bearing and shaft. The tendency of the shaft to seize is exacerbated by the fact that a bearing is often press fit into a valve body along its exterior surface, and, upon undergoing dramatic changes in temperature, tends to expand inwardly toward the outer surface of the shaft, rendering the valve inoperable.

It is therefore desirable to provide a valve with a bearing assembly adapted to guide the valve, shaft as it reciprocates through the valve body, and which is self-compensating when subjected to extreme temperature changes such that thermal expansion of the shaft/bearing does not interfere with valve actuation.

SUMMARY OF THE INVENTION

The present invention provides a valve including a self-compensating bearing assembly including a rigid bearing member for guiding the valve shaft as it reciprocates through the valve body and a pliant annulus surrounding the valve shaft having a density and thickness sufficient to accommodate distortion of the rigid bearing member in response to changes in temperature without interfering with shaft actuation.

The pliant annulus has multiple degrees of freedom and its pliancy can be varied depending on its material composition. For example, the pliant annulus may be a woven metal mesh core, the pliancy of which is determinable by the filament size and weave density.

These and other features and advantages of the invention will be more fully understood from the following description of certain specific embodiments of the invention taken together with the accompanying drawings.

DESCRIPTION OF THE PREFERRED EMBODIMENT

Figure 1:
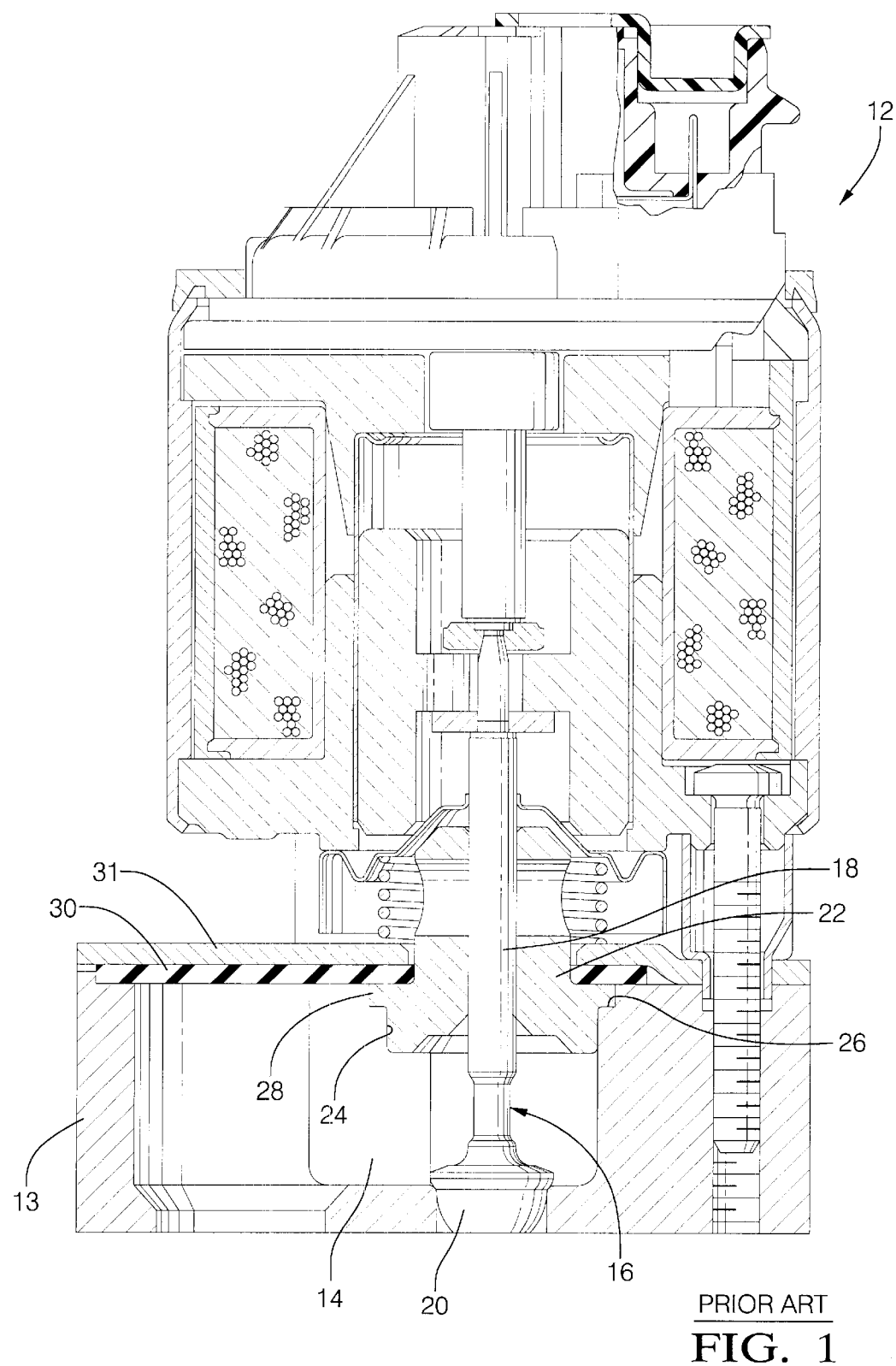
FIG. 1 is a sectional elevational view of a prior art EGR valve.

Referring now to the drawings in detail, numeral 10 generally indicates a bearing assembly according to the present invention. FIG. 1 shows an EGR valve 12 including a valve body 13 defining a passage 14 communicable with the intake and exhaust systems of a vehicle (not shown). Reciprocable within the valve body to open and close the passage 14 is a valve member or pintle 16 including a shaft 18 extending from a valve head 20 and supported by a bearing 22. Bearing 22 is pressed into a part-cylindrical surface 24 defined by the valve body 13 and is supported on a valve body surface 26 by an annular flange 28. Annular flange 28 also supports a gasket 30 sealingly engaged to a plate 31 connected with the valve body 13. To minimize leakage of gases from the valve 12, minimal clearance is provided between the bearing 22 and the shaft 18.

In operation, the EGR valve 12 is exposed to extreme changes in temperature. Moreover, bearing 22 is formed of sintered brass, and shaft 18 of stainless steel, materials having very different thermal properties. Because bearing 22 is tightly retained along its exterior surface in valve body 13, the changes in temperature will cause the bearing to expand along its less restricted inner surface, and toward the shaft, possibly resulting in seizure of the shaft in the bearing.

Figure 2:
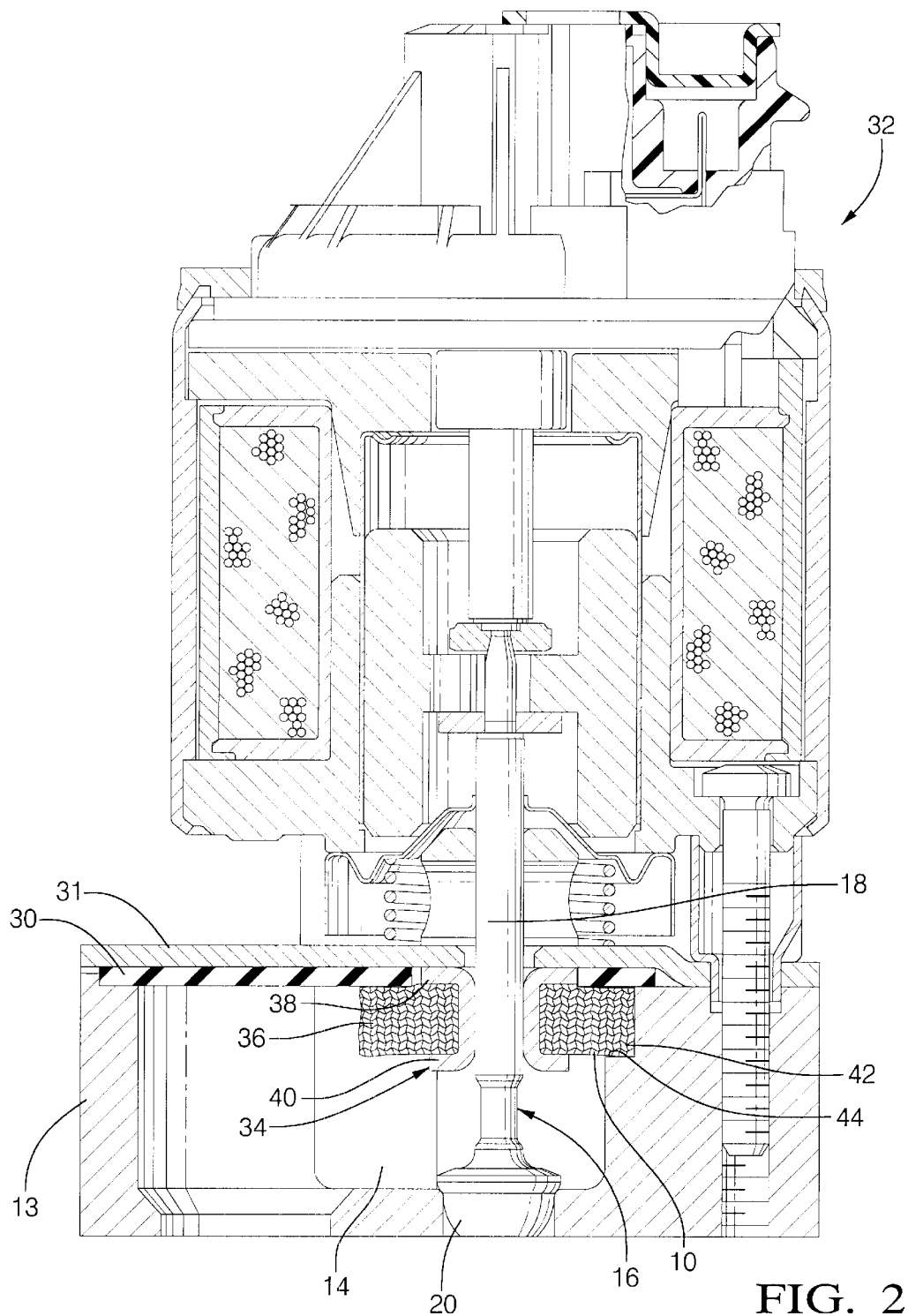
FIG. 2 is a sectional elevational view of an EGR valve incorporating the bearing assembly of the present invention.
Figure 3:
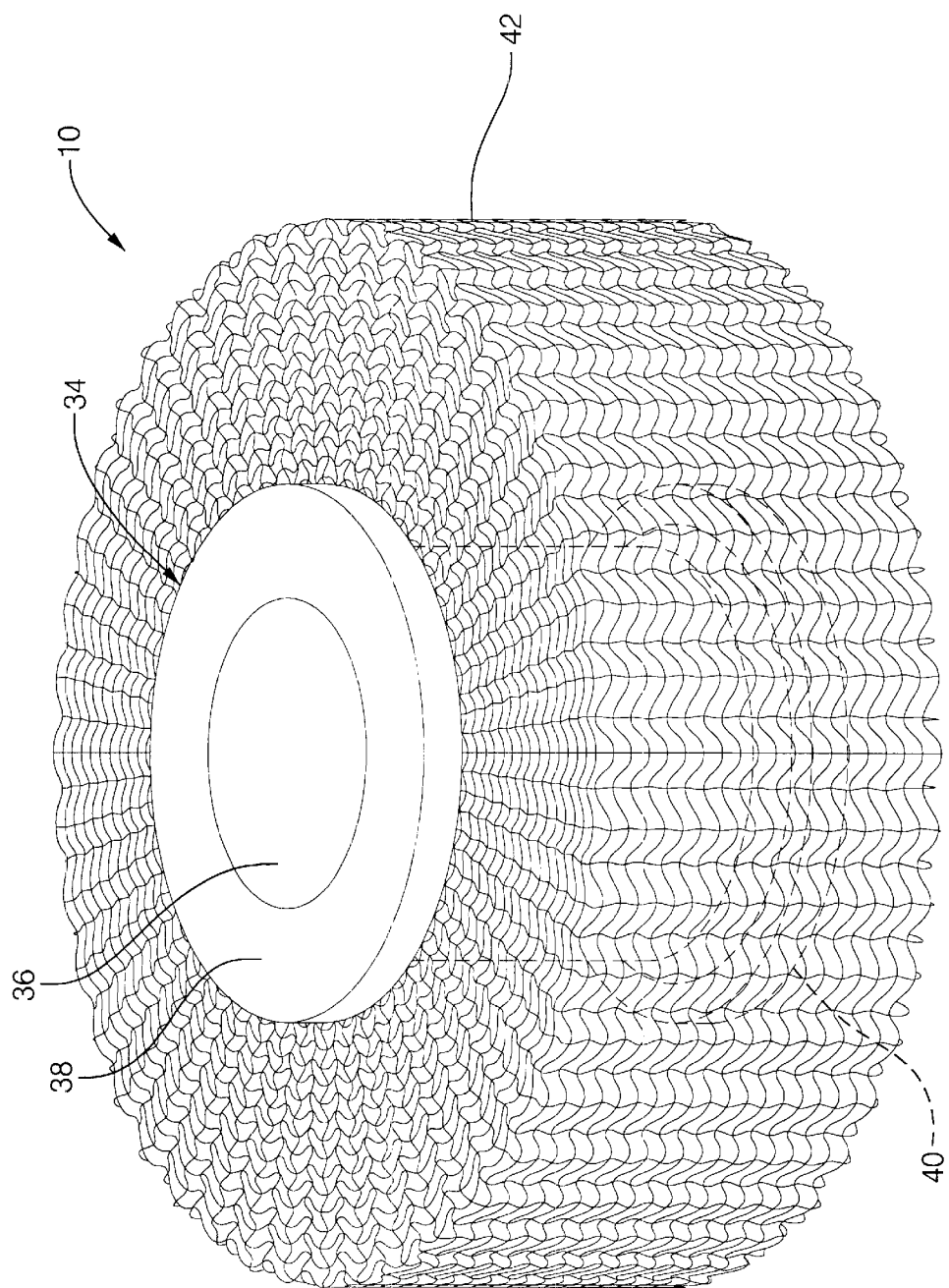
FIG. 3 is an enlarged perspective view of an embodiment of the present invention.

FIG. 2 shows a sectional elevational view of an improved EGR valve 32 similar to that of FIG. 1, but incorporating the bearing assembly 10 of the present invention. In general, valve 32 operates in much the same manner. as the valve 12 previously described and, where appropriate, like numerals indicate like parts. As shown in FIG. 2, valve shaft 18 is supported by the self-compensating bearing assembly 10 of the present invention. In a preferred embodiment, shown in FIG. 3, the bearing assembly 10 includes a rigid bearing member 34 having a substantially cylindrical body 36 connected between an upper flange 38 and a lower flange 40. Rigid bearing member 34 provides radial support and axial guidance to the valve shaft 18 as it reciprocates through the valve body 13. The clearance between the valve shaft 18 and the rigid bearing member 34 should be maintained as close as practicable to minimize gas leakage along the shaft without interfering with shaft actuation.

To achieve this goal, a pliant annulus 42 is provided surrounding the body 36 of the bearing member 34 and engaging the upper and lower flanges 38, 40. In this particular embodiment, the pliant annulus 42 is supported on a recessed surface 44. of the valve body and holds the upper flange 38 of the pliant annulus 42 against a lower surface of the plate 31. In a preferred embodiment, the pliant annulus 42 is a woven metal mesh core constructed of any suitable metal wire, such as stainless steel, and has a density and thickness sufficient to accommodate distortion of the rigid bearing member in response to changes in temperature without interfering with shaft actuation. Suitable materials for the pliant annulus 42 are available from Metex Corporation of Edison, N.J., USA.

Optimal support is provided where the annulus 42 has an axial thickness of approximately two times the shaft 18 diameter and has an outer diameter about four to five times that of the shaft 18. By varying the filament size and the weave density, the stiffness (or pliability) of the annulus 42 may be modified. Rigid bearing member 34 may be constructed of, or coated with, any material which will achieve lubricity between the reciprocating shaft and its bearing assembly 10. As can be appreciated from FIG. 2, any radial growth of the rigid bearing member 34 in response to changes in temperature is readily accommodated by a corresponding deflection of the pliant annulus 42. To this end, the pliant annulus 42 enjoys multiple degrees of freedom, permitting the rigid bearing member 34 to expand or contract while holding the flange 38 against the plate 31 and maintaining the minimal clearance necessary between the shaft 18 and the rigid bearing member 34 to minimize exhaust gas leakage, without interfering with shaft actuation.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. An EGR valve for use in an engine, comprising:
   a valve body;
   a valve member including a shaft reciprocable in the valve body for controlling exhaust gas flow through the valve; and
   a self-compensating bearing assembly supported in the valve body, the assembly including a rigid bearing member providing radial support and axial guidance to said reciprocable shaft, and a pliant annulus supporting and surrounding the rigid bearing member and having a density and thickness sufficient to accommodate distortion of the rigid bearing member in response to changes in temperature without interfering with shaft actuation.

2. The valve of claim 1, wherein the pliant annulus is a woven mesh core.

3. The valve of claim 1, wherein the pliant annulus has an outer diameter at least four times larger than the diameter of the valve shaft.

4. The valve of claim 1, wherein the pliant annulus has an axial thickness approximately twice the diameter of the valve shaft.

5. A self-compensating bearing assembly for use with a valve including a valve member having a shaft reciprocable within a valve body, said assembly comprising:
   a rigid bearing member for providing radial support and axial guidance to the valve shaft as the shaft reciprocates in the valve body; and
   a pliant annulus supporting the bearing member, said pliant annulus having a density and thickness sufficient to accommodate distortion of the rigid bearing member in response to changes in temperature without interfering with shaft actuation.

6. The bearing assembly of claim 5, wherein the pliant annulus is a woven mesh core.

7. The bearing assembly of claim 5, wherein the pliant annulus has an outer diameter at least four times larger than the diameter of the valve shaft.

8. The bearing assembly of claim 5, wherein the pliant annulus has an axial thickness approximately twice the diameter of the valve shaft.

* * * * *